W. CHURCHILL.
FRESNEL LENS.
APPLICATION FILED MAR. 6, 1913.
1,076,628. Patented Oct. 21, 1913.
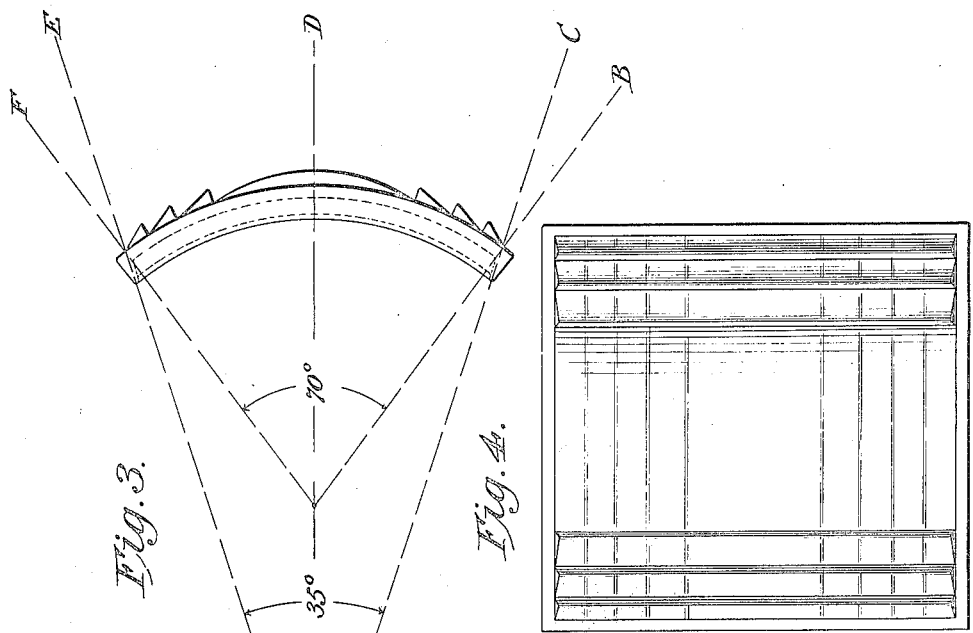
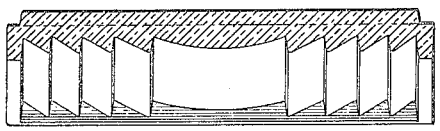
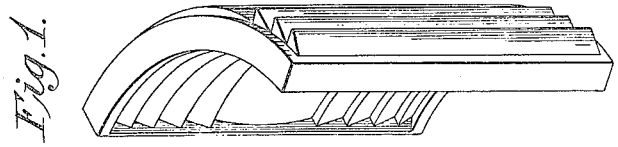

UNITED STATES PATENT OFFICE.

WILLIAM CHURCHILL, OF CORNING, NEW YORK, ASSIGNOR TO CORNING GLASS WORKS, OF CORNING, NEW YORK.

FRESNEL LENS.

1,076,628.   Specification of Letters Patent.   Patented Oct. 21, 1913.

Application filed March 6, 1913. Serial No. 752,425.

*To all whom it may concern:*

Be it known that I, WILLIAM CHURCHILL, a citizen of the United States, residing at Corning, in the county of Steuben and State of New York, have invented new and useful Improvements in Fresnel Lenses, of which the following is a specification.

In order to meet certain conditions in the use of lenses for signaling purposes it is desirable to produce a beam of uniform intensity over a relatively wide angle. For example, in railroad service signals are sometimes necessarily located on curves, and in such cases the spread of beam obtainable with the ordinary semaphore lens is not sufficient to cover the entire angle through which the signal light should be visible to afford adequate protection. On the other hand, when a Fresnel of the ordinary type is employed in connection with the usual source of illumination the concentration and corresponding magnification of light produced by the lens is not sufficiently great to afford a signal of the requisite brilliancy.

A lens designed and constructed according to my invention produces a beam of uniform intensity, and at the same time affords much greater brilliancy than can be obtainable with a Fresnel of the usual type.

I use a lens which in general contour is cylindrical as in the case of an ordinary Fresnel, but which differs therefrom in that its inner face is furnished with a convex lenticular surface and with a series of prismatic corrugations the latter condensing the light impinging on the lens in a dimension at right angles to the bounding surface of the cylinder. The outer surface of my improved lens is also furnished with a convex lenticular surface and with a series of prismatic corrugations, but such lenticular surface and corrugations are disposed at right angles to those on the inner face of the lens. Furthermore, one of the faces of the lens is so constructed that it shall have a curvature and condensing power different from the curvature and condensing power of the other face of the lens. I do not aim to produce by means of the outer prisms the same amount of convergence as is effected by the inner prisms. If that were done we should get a result which would be practically the equivalent of that obtained by an ordinary condenser having spherical surfaces on one or both faces, such, for example, as is usual in a lens of the so-called semaphore type. The prisms on the outer face of my improved lens are merely given sufficient curvature to converge within a relatively narrow angle the beam which would otherwise cover a much wider angle.

Referring to the drawing, Figure 1 is a perspective view of my improved lens. Fig. 2 is a cross section of the lens on the axis A—D. Fig. 3 is a top view of the lens, and illustrates the convergence of the beam by means of the prisms of the outer face. Fig. 4 is a front view of the lens.

It will be seen from Fig. 3 that, although the Fresnel lens is so designed as to cover a horizontal angle of 70 degrees with respect to the source of illumination at the point A, namely the angle B—A—F, yet, by means of the converging prisms on the outer face, the light, which otherwise would be distributed uniformly over the angle B—A—F, is converged and condensed over the narrow angle C—A'—E, which in this instance is one of 35 degrees. Accordingly within the limits of said angle C—A'—E, there is double the illumination which could be obtained in case the lens were constructed in the usual manner with prismatic corrugations on one face only, the other face being cylindrical. I have accordingly produced a lens which possesses the important characteristic of distributing the light received over a relatively wide angle with uniform intensity, and which further, by means of the corrugations on the outer face, largely increases the intensity of the projected beam within the limits of its spread.

While Fig. 3 affords an illustration of the convergence of a beam of 70 degrees spread within an angle of 35 degrees whereby is secured double the intensity which a lens of the ordinary Fresnel type and similar dimensions could produce, by condensing a beam of say 75 degrees of spread into 25 degrees we can, if desired, produce a beam having three times the intensity of one produced by a similar Fresnel. It is therefore obvious that the principle herein described admits of a wide variety of applications according to special requirements.

I do not limit myself to the exact design before mentioned wherein prismatic corrugations, characteristic of the ordinary Fresnel, are disposed upon the inner face, and a second series of prismatic corrugations are disposed on the outer face at right angles to the first. This relation, if so desired, may be reversed, thereby bringing the prisms of less curvature and condensing power upon the inner face, while the other series of prisms at right angles to the first, and of greater condensing power, are disposed upon the outer face of the Fresnel segment. It is also obvious that such Fresnel segments may be combined, if desired, to form a cylinder of 360 degrees, the individual segments being united by metal fittings, cement or similar means.

Having thus described my invention, I claim:—

1. A Fresnel lens having its inner and outer faces each provided with a convex lenticular surface and a series of prismatic corrugations parallel thereto, the convex lenticular surface and prismatic corrugations disposed on one face of the lens being at right angles to those disposed upon its other face, substantially as set forth.

2. A Fresnel lens having its inner and outer faces each provided with a convex lenticular surface and a series of prismatic corrugations parallel thereto, the convex lenticular surface and prismatic corrugations disposed on one face of the lens being at right angles to those disposed upon its other face, and each face of the lens having different curvature and condensing power, substantially as set forth.

In testimony whereof I affix my signature in presence of two witnesses.

WILLIAM CHURCHILL.

Witnesses:
 DELPHINE KEAGLE,
 G. WILLIS DRAKE.